March 1, 1960
W. E. BRADLEY
2,927,319
SHORT RANGE RADAR SYSTEM
Filed Jan. 16, 1957
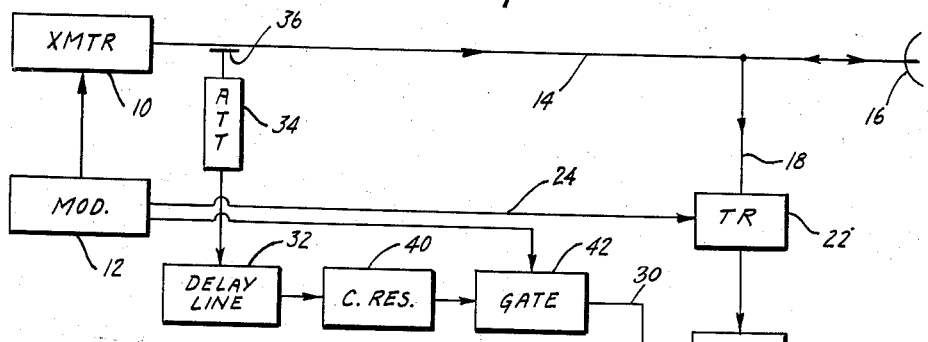
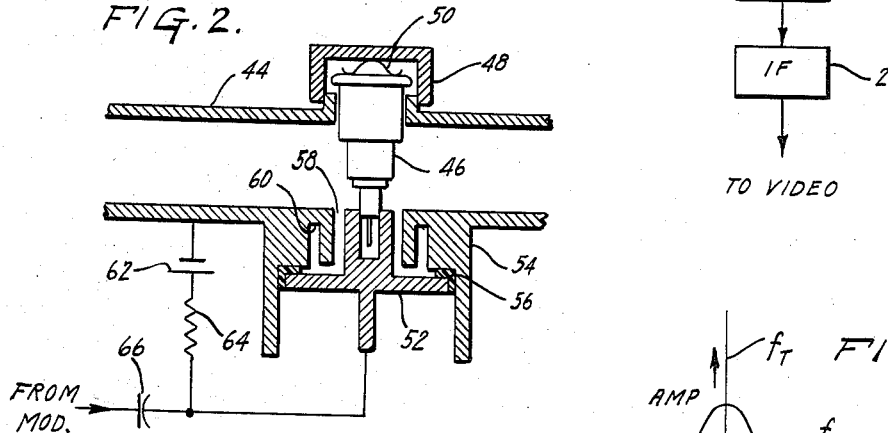
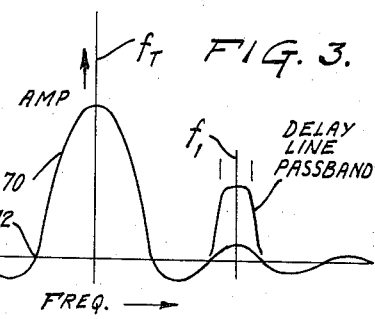
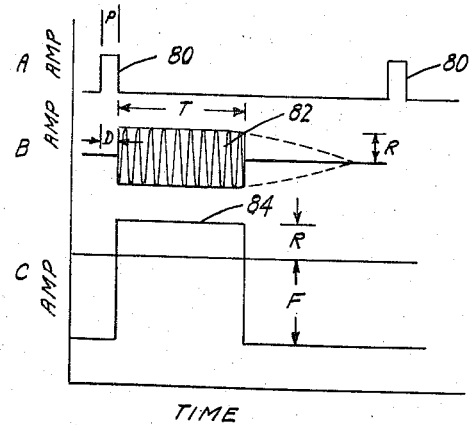
INVENTOR.
WILLIAM E. BRADLEY
BY
ATTORNEY

United States Patent Office 2,927,319
Patented Mar. 1, 1960

2,927,319

SHORT RANGE RADAR SYSTEM

William E. Bradley, New Hope, Pa., assignor to Philco Corporation, Philadelphia, Pa., a corporation of Pennsylvania Application January 16, 1957, Serial No. 634,575

15 Claims. (Cl. 343—17.1)

The present invention relates to radar systems and more particularly to improvements in low power, short range, superheterodyne pulse-type radar systems.

Advances in the electronic art have made it possible to construct radar systems having very short duration transmitted pulses, for example pulses having a duration of a few millimicroseconds. This has opened the way to radar systems having a minimum range of the order of 10 feet or less and a range discrimination of the same order of magnitude. That is, a radar system having a pulse duration of 20 millimicroseconds can discriminate between two targets which are separated in range by less than 10 feet. Recent advances in the compactness and reliability of low power transmitting oscillators and similar advances in the fields of transistorized circuitry and printed microwave components have made possible compact and reliable radar systems having maximum ranges of the order of a mile or less and minimum ranges and range discrimination of the order mentioned. Such radar systems are ideally suited for collision warning radars for vehicles, for radar fuzes in missiles and for other similar applications.

In radar systems, particularly low power, short range radar systems, superheterodyne receivers are preferred over crystal video receivers since the superheterodyne receiver is more sensitive than the crystal video receiver and recovers faster from overloading caused by the reception of a strong signal. However, despite the advances mentioned above, known types of superheterodyne receivers are too complex to permit their use in extremely light weight, compact radar systems. The major reason why the superheterodyne receiver is more complex than the crystal video receiver is that the superheterodyne receiver normally requires a separate circuit for generating a local oscillator signal of accurately controlled frequency.

In collision warning radar systems and radar fuzes it is frequently desirable to gate the receiver of a radar system so that only echo signals in the immediate vicinity of the desired target appear at the output of the receiver. This avoids interference from unwanted targets both in space and on the vehicle carrying the radar system. In the past the gating circuits have introduced unwanted complexity into the radar systems.

Therefore, it is an object of the present invention to provide an improved and simplified radar system of the superheterodyne type.

A further object of the present invention is to provide a radar system of the superheterodyne type which requires no separate local oscillator circuit.

Still another object of the present invention is to provide a simple, reliable range gated radar system.

An additional object of the present invention is to provide a short range radar system which may be gated to respond to a range interval of the order of a few feet.

These and other objects of the present invention are achieved by providing means for deriving the necessary local oscillations from the energy spectrum of the transmitted pulse, said means being so arranged that the local oscillations may be delayed, prolonged or terminated at will.

For a better understanding of the present invention together with other and further objects thereof reference should now be made to the following detailed description which is to be read in conjunction with the accompanying drawings in which:

Fig. 1 is a block diagram of a preferred embodiment of the present invention;

Fig. 2 is a schematic drawing partially in section showing the connection of the diode gate element included in the circuit of Fig. 1;

Fig. 3 is a frequency diagram illustrating the principle of operation of the circuit of Fig. 1; and Fig. 4 is a series of waveforms further illustrating the operation of the block diagram of Fig. 1.

Turning now to Fig. 1, block 10 represents a transmitter. Transmitter 10 may be a klystron oscillator or a pulsed magnetron oscillator. One form of oscillator circuit particularly well suited for low power short range radar systems is described and claimed in the copending application of Thomas J. Ryan, Serial No. 586,965, filed May 24, 1956, now Patent No. 2,844,725. Transmitter 10 generates microwave frequency signals preferably in the X-band or in the K-band. These signals are generated in response to, and only for the duration of, the pulses supplied from modulator 12. The pulses supplied from modulator 12 to transmitter 10 may have a duration P of the order of a few millimicroseconds, 20 millimicroseconds being a typical example. These pulses supplied by modulator 12 to transmitter 10 recur at the desired repetition rate of the radar system.

The microwave frequency signals generated by transmitter 10 are supplied over transmission line 14 to antenna 16. Transmission line 14 may be either a coaxial line or a waveguide, the latter being preferred because of its simplicity and lower attenuation. In extremely small, compact systems, waveguide 14 may be in the form of printed or microstrip waveguide.

A second transmission line 18 is connected to transmission line 14 in a parallel T-junction. Signals received by antenna 16 pass down transmission line 14 and transmission line 18 to the mixer 20.

A T—R device 22 is provided between mixer 20 and transmission line 14 to exclude the high powered transmitted pulses from the mixer. T—R device 22 should be capable of a very rapid recovery time following the transmitted pulse. A preferred form of T—R device employing semiconducting diodes connected in shunt across a waveguide or other form of transmission line is disclosed and claimed in my copending application, Serial No. 623,153, filed November 19, 1956. In this T—R device means are provided for biasing the semiconducting diodes in the forward direction during the intervals in which the high level transmitted pulses are supplied to waveguide 14. As explained in my copending application, the diodes effectively block the passage of a signal from waveguide 18 to mixer 20. Following the transmitted pulse the diodes are biased in the backward direction thereby permitting received signals to reach mixer 20 with very little attenuation. The pulse signals which control T—R device 22 may be supplied from modulator 12 by way of connection 24.

Mixer 20 is followed by the usual intermediate frequency stages 26 of a superheterodyne receiver and by video and utilization circuits (not shown in Fig. 1). Local oscillations derived from the energy of the transmitted pulse are supplied to heterodyne mixer 20 via connection 30. The circuit for deriving these local oscillations comprises a frequency selective delay line 32 which is loosely coupled to transmission line 14 by means of an attenuator 34 and coupling device 36. Attenuator 34 is included in the block diagram of Fig. 1 merely to illustrate that only a small fraction of the energy of the transmitted pulse is supplied to the frequency selective delay line 32. For reasons which will be described in more detail presently delay line 32 preferably has a limited pass-band which is centered at a frequency which is well removed from the carrier frequency of the transmitted signal but still in the band occupied by the sidebands of the transmitted pulses. The skirt selectivity of delay line 32 should be sufficiently good to exclude from the delay line the larger sideband components of the transmitted pulses which occur in the vicinity of the carrier frequency.

The output terminals of frequency selective delay line 32 are coupled to the input of a cavity resonator 40. Cavity resonator 40 is preferably tuned to a frequency equal to the center frequency of the passband of delay line 32. As a result, the cavity resonator 40 is excited by the signal at the output of delay line 32. Preferably cavity resonator 40 is selected to have a high Q and a narrow bandwidth in order that it will continue to oscillate with a very low decrement after the energization from delay line 32 has ceased. The output of cavity resonator 40 is supplied by way of gate circuit 42 to the input connection 30 of heterodyne mixer 20. Gate 42 may be a semiconducting diode gate circuit of the type employed in T—R device 22. A diode gate of this type is illustrated in Fig. 2. The signal to actuate gate circuit 42 occurs at the pulse repetition rate of the radar system and therefore it may be derived from modulator 12 also.

Fig. 2 shows a waveguide section 44 in which is inserted a semiconducting diode 46. The section plane is parallel to the longitudinal axis of the waveguide and perpendicular to the broad walls thereof. Cap 48 provides means for inserting the diode into the waveguide. Contact spring 50 and cap 48 connect one terminal of the diode to the upper broad wall of waveguide 44. Member 52 makes electrical contact with the other terminal of diode 46. Member 52 is insulated from the portion 54 of waveguide 44 by suitable dielectric material 56. Member 52 and portion 54 of waveguide 44 are so formed that the space between member 52 and portion 54 of waveguide 44 forms a short-circuited waveguide section which is one-half wavelength long measured from the inner surface of waveguide 44 at point 58 to the short circuit at point 60. Therefore diode 46 appears to be connected in shunt with the waveguide 44 at signal frequencies. Since member 52 is insulated from the waveguide for low frequencies, suitable biasing signals may be supplied thereto to bias diode 46. Bias battery 62 and resistor capacitor network 64—66 provide means for applying a steady bias potential to diode 46 and means for superimposing a pulse on the steady bias. As mentioned above, diodes connected as shown in Fig. 2 may be employed in gate circuit 42 and T—R device 22.

The operation of the invention will now be explained with references to Figs. 3 and 4 of the drawing. The envelope of the frequency spectrum of the pulses supplied by transmitter 10 is shown in Fig. 3. The curve 70 of Fig. 3 is the well known $$\frac{\sin x}{x}$$

function. The frequency $f_T$ of Fig. 3 represents the carrier frequency of the pulse generated by transmitter 10. The first zero crossing 72 of the function $$\frac{\sin x}{x}$$

will be spaced from the transmitter frequency $f_T$ by an amount equal to the reciprocal of the pulse width P.

If a pulse width of 20 millimicroseconds is employed the first zero crossing will occur at $f_T$ plus 50 megacycles. The second and third zero crossings will be displaced from the frequency $f_T$ by amounts twice the reciprocal of the pulse width and three times the reciprocal of the pulse width, or 100 megacycles and 150 megacycles, respectively, for the example chosen. The center of the passband is located at a frequency $$f_T \pm \frac{2n+1}{2P}$$

where $n$ is an integer. It will be seen that this places the center frequency of the passband of delay line 32 near the peak of one of the side lobes of the $$\frac{\sin x}{x}$$

function. If the center of the passband of delay line 32 is tuned to a frequency which is displaced from the frequency $f_T$ by 2½ times the reciprocal of the transmitted pulse width P, that is if $n$ equals 2, it will occupy the position $f_1$ shown in Fig. 3. As shown in Fig. 3 frequency $f_1$ is centered on the second side lobe of the $$\frac{\sin x}{x}$$

function. The width of the passband of delay line 32 is made equal to $a/P$ where $a$ is greater than zero and less than approximately one. The energy content of the second side lobe represents about 1.6 percent of the total energy of the pulse. If the delay line 32 has a passband which can be represented by a substantially rectangular amplitude versus frequency curve and which is limited to approximately four-fifths the width of the side lobe as indicated in Fig. 3, the delay line will pass approximately 80 percent of the energy of this side lobe. However, the limited passband of delay line 32 will exclude energy in the main lobe of the $$\frac{\sin x}{x}$$

spectrum. Since cavity resonator 40 is tuned to the frequency $f_1$, it will be excited into oscillation by the energy of the second side lobe.

The time of the initial excitation of cavity resonator 40 will follow the transmitted pulses by approximately the delay time D of delay line 32. Pulses 80 of Fig. 4A represent the envelopes of the pulses supplied by transmitter 10. The signal at the output of cavity resonator 40 is shown at 82 in Fig. 4B. The bias circuit associated with diode gate 42 normally biases gate 42 in the forward direction by a preselected amount F as shown in Fig. 4C. Gate 42 acts as a damping impedance across cavity resonator 40 which effectively suppresses any oscillations in the cavity resonator.

A pulse 84, Fig. 4C, is supplied by modulator 12 to gate 42. The leading edge of this pulse occurs in time coincidence with, or just prior to, the excitation of cavity resonator 40 by the signal from delay line 32. Pulse 84 biases gate circuit 42 in the backward direction by a preselected amount R as shown in Fig. 4C. Gate circuit 42 is preferably biased in the backward direction by an amount exactly equal to the maximum amplitude of the local oscillations to be supplied to mixer 20. For example it may be desirable to supply local oscillations having a peak value of one volt. In this case the diode gate circuit 42 will be biased in the reverse direction by about one volt. If the amplitude of the signal from cavity resonator 40 exceeds this one volt level, gate 42 will be driven into the forward conducting region on alternate half cycles of the signal and will act as a damping impedance across cavity resonator 40. However, once the oscillation in cavity resonator 32 has been reduced to an amplitude of one volt, gate circuit 42 will no longer be driven into the forward conducting region and the signal from cavity resonator 40 will be supplied directly to mixer 20 without any limiting action on the part of gate circuit 42. The limiting action of gate circuit 42 protects the mixer crystal from excessively large signals from cavity resonator 40 which might overload and damage it.

During the interval T shown in Fig. 4B mixer 20 will function as a normal heterodyne mixer circuit. Received echoes will be supplied to mixer 20 by way of antenna 16 and transmission line 18. Local oscillations are supplied by cavity resonator 40. The energy of the local oscillations is derived from the transmitted pulse but, for the reasons just given, the frequency of the local oscillations will be separated from the carrier frequency of the transmitted pulse by the desired intermediate frequency of the system. This intermediate frequency is equal to $f_T - f_1$.

The local oscillations supplied by cavity resonator 40 will decrease in amplitude with time owing to the damping in the resonator itself and the loading caused by mixer 20. However, if cavity resonator 40 is constructed to have low damping and mixer 20 is loosely coupled to resonator 40 the decrease in amplitude will not affect the operation of the radar system for several microseconds. This will give ample range to low power, short range radar systems.

At the termination of pulse 84, that is at the end of interval T of Fig. 4B, diode gate 42 is again biased in the forward direction. This action terminates the oscillation in cavity resonator 40. If extremely sharp range gating is desired switching diodes should also be connected across the tuned elements of the delay line 32. These diodes may be pulsed in synchronism with diode gate 42.

The removal of the local oscillations from mixer 20 which results when gate 42 is biased in the forward direction effectively gates off the output signal of mixer 20. Therefore the receiver system, of which mixer 20 forms the initial stage, may be range gated by selecting the delay time of delay line 32 and the duration of the gate signal supplied to gate circuit 42 so that the local oscillations are supplied to mixer 20 only during the desired range interval. It should be kept in mind that the limited passband of delay line 32 will cause a stretching of the pulses supplied to the input. Therefore in some instances sharper range gating may be achieved if the pulse to gate 42 is not initiated until after the leading edge of the delayed pulse appears at the output of delay line 32. If this is done the damping resistance is not removed from resonator 40 until the energizing signal supplied by delay line 32 has reached a substantial amplitude. The damping provided by gate circuit 42 will reduce the energy available for the local oscillator signal but sufficient energy will still remain for the short reception interval normally employed in range gated systems.

The system just described is a superheterodyne pulse radar with a portion of the transmitter energy being reserved for the production of local oscillations by a high frequency delay line. The amplitude of the output from the delay line is limited by an appropriately biased crystal diode. This diode alone or together with other crystal diodes associated with the high frequency delay line provide means for stopping the local oscillations to provide range cut-off in the receiver. If range gating is not desired delay line 32 and/or gate 42 may be omitted. However, means should be provided between coupling device 36 and cavity resonator 40 for blocking the sidebands included in the major lobe of the $$\frac{\text{Sine } x}{x}$$

function. It should be understood that in many instances attenuator 34 of Fig. 1 may be omitted or combined with delay line 32 or coupling device 36. The function of attenuator 34 is to insure that the amplitude of the signal supplied to delay line 32 and cavity resonator 40 does not greatly exceed the desired amplitude for the local oscillator signal. If attenuator 34 and/or gate 42 are omitted suitable means should be provided to protect mixer 20 from possible damage due to excessively large local oscillations.

While the invention has been described with reference to a single embodiment thereof, various modifications and other embodiments thereof will occur to those skilled in the art within the scope of the invention. Accordingly I desire the scope of my invention to be limited only by the appended claims.

What is claimed is:

1. A superheterodyne radar system comprising a transmitter providing a repetitive series of pulses, antenna means coupled to said transmitter for radiating said pulses into space and receiving object reflected echo signals, a heterodyne mixer circuit having a signal input and a local oscillation input, means coupling said antenna to said signal input, means associated with said transmitter for extracting energy from said repetitive series of pulses at a frequency different from the carrier frequency of said pulses, the output of said last-mentioned means being coupled to said local oscillation input of said mixer.

2. A superheterodyne radar system comprising a transmitter providing a repetitive series of pulses, antenna means coupled to said transmitter for radiating said pulses into space and receiving object reflected echo signals, a heterodyne mixer circuit having a signal input and a local oscillation input, means coupling said antenna to said signal input, means associated with said transmitter for extracting a local oscillation signal from said repetitive series of pulses, the frequency of said extracted local oscillation signal differing from the carrier frequency of said pulses by a preselected amount, the output of said last-mentioned means being coupled to said local oscillation input of said mixer.

3. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input coupled to said antenna, and a bandpass signal coupling circuit coupling said transmitter to a local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer.

4. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input coupled to said antenna, and a bandpass signal coupling circuit coupling said transmitter to a local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer, said signal coupling circuit including means for delaying for a selected time the application of the signal from said transmitter to said local oscillation input of said mixer.

5. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer, said signal coupling circuit including means for delaying for a selected time the application of the signal from said transmitter to said local oscillation input of said mixer and means for terminating at a second selected time the signal at the local oscillation input of said mixer whereby only signals within a selected range zone are passed by said mixer.

6. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer, said coupling circuit including a gate means, said gate means blocking the passage of a signal from said transmitter to said mixer if supplied with a first bias voltage and permitting the passage of a signal if supplied with a second bias voltage, means for supplying said gate circuit with said first bias voltage, and means for altering the bias supplied to said gate to said second voltage at selected times, thereby causing local oscillations to be supplied to said mixer only at selected times.

7. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer, said coupling circuit including a signal transmission line, a diode gate circuit connected in shunt with said signal transmission line, means for normally biasing said diode gate circuit in the forward direction thereby to prevent the passage of a signal along said signal transmission line and means for biasing said diode gate circuit in the backward direction at selected times, thereby to permit the passage of local oscillations from said transmitter to said mixer.

8. A radar system according to claim 7 wherein said signal transmission line is connected to said local oscillation input of said mixer and wherein said diode gate circuit is biased in the backward direction by an amount equal to the maximum amplitude of the signal to be supplied to said local oscillation input whereby said diode gate acts as a limiter for signals exceeding said maximum amplitude.

9. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, the width of the passband of said coupling circuit being $a/P$ cycles per second, where $a$ has a value greater than zero and less than approximately one, the center frequency of said passband being equal to approximately $$f \pm \frac{2n+1}{2P}$$

where $n$ is an integer, said signal coupling circuit including a bandpass delay means for delaying the signal supplied by said transmitter, a signal transmission means disposed between said delay means and said mixer, a diode gate circuit connected in shunt with said transmission line, means for normally biasing said diode gate circuit in the forward direction thereby to prevent the passage of a signal along said transmission line and means for biasing said diode gate circuit in the backward direction at selected times, thereby to permit the passage of a signal from said transmitter to said mixer.

10. A radar system according to claim 9 wherein said transmission line is connected to said local oscillation input of said mixer and wherein said diode gate circuit is biased in the backward direction by an amount equal to the maximum amplitude of the signal to be supplied by said local oscillator input whereby said diode gate acts as a limiter for signals exceeding said maximum amplitude.

11. A superheterodyne radar system comprising a transmitter providing a repetitive series of pulses having a carrier frequency of $f$ cycles per second, and time duration of P seconds, antenna means for radiating said pulses into space and for receiving object reflected echo signals, energy transmission means connecting said transmitter to said antenna, a heterodyne mixer circuit having a signal input and a local oscillation input, a T—R device coupling said signal input to said energy transmission means, and a signal coupling circuit coupling said energy transmission means to said local oscillation input of said mixer, said coupling circuit comprising a bandpass signal delay means, a cavity resonator and a signal transmission means connected in cascade in the order recited, said signal transmission means being connected to said local oscillator input of said mixer, the center frequency of the passband of said signal delay means and the resonant frequency of said cavity resonator being equal to approximately $$f \pm \frac{2n+1}{2P}$$

where $n$ is an integer, the width of the passband of said signal delay means being equal to $a/P$ cycles per second, where $a$ has a value greater than zero and less than approximately one.

12. A superheterodyne radar system according to claim 11, said system further comprising a diode gate circuit connected in shunt with said signal transmission means, means for normally biasing said diode gate circuit in the forward direction thereby to prevent the passage of a signal along said signal transmission means, and means for biasing said diode gate circuit in the backward direction at selected times by an amount equal to the maximum amplitude of the signal to be supplied to said local oscillator input thereby to permit the passage of a signal through said signal transmission means, the amplitude of the signal passed by said signal transmisison means being limited by said diode gate circuit to said maximum amplitude.

13. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, the center frequency of said passband being equal to approximately $$f \pm \frac{2n+1}{2P}$$

where $n$ is an integer, the width of the passband of said signal coupling circuit being substantially less than $$\frac{2n+1}{P}$$

14. A superheterodyne radar system comprising a transmitter providing a repetitive series of pulses having a carrier frequency of $f$ cycles per second and time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass coupling circuit coupling said transmitter to said local oscillation input of said mixer, said bandpass couping circuit being adapted to pass one of the non-zero Fourier components of said repetitive series of pulses, said Fourier component having a frequency different from said carrier frequency $f$.

15. A superheterodyne radar system comprising a transmitter providing a repetitive series of pulses having a carrier frequency of $f$ cycles per second and a time duration of P seconds, antenna means coupled to said transmitter for radiating said pulses into space and receiving object reflected echo signals, a heterodyne mixer circuit having a signal input and a local oscillation input, means coupling said signal input to said antenna, and a bandpass signal coupling circuit coupling said transmitter to said local oscillation input of said mixer, said bandpass signal coupling circuit being adapted to pass one of the non-zero Fourier components of said repetitive series of pulses having a frequency different from said carrier frequency $f$, said coupling circuit including a signal transmission line, a diode gate circuit connected in shunt with said signal transmission line, means for normally biasing said diode gate circuit in the forward direction thereby to prevent the passage of a signal along said signal transmission line and means for biasing said diode gate circuit in the backward direction at selected times, thereby to permit passage of local oscillations from said transmitter to said mixer.

References Cited in the file of this patent

UNITED STATES PATENTS

| | | |
|---|---|---|
| 2,535,274 | Dicke | Dec. 26, 1950 |
| 2,684,478 | Fox | July 20, 1954 |